United States Patent
Xue et al.

[11] Patent Number: 5,972,157
[45] Date of Patent: *Oct. 26, 1999

[54] JOINING OF ROUGH CARBON-CARBON COMPOSITES WITH HIGH JOINT STRENGTH

[75] Inventors: Liang An Xue, Lake Hiawatha; Dave Narasimhan, Flemington, both of N.J.

[73] Assignee: AlliedSignal Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/699,751

[22] Filed: Aug. 20, 1996

Related U.S. Application Data
[60] Provisional application No. 60/006,996, Nov. 20, 1995.

[51] Int. Cl.$^6$ .................................................. B29C 65/00
[52] U.S. Cl. .................. 156/285; 156/89.11; 156/89.25; 156/89.27; 156/89.28; 156/89.26; 156/182; 228/121; 403/271
[58] Field of Search .................................... 156/73.5, 182, 156/276, 285, 89, 89.11–19, 89.21–28; 228/121; 403/271

[56] References Cited

U.S. PATENT DOCUMENTS

| | | | |
|---|---|---|---|
| 2,979,813 | 4/1961 | Steinberg | 29/470 |
| 3,097,931 | 7/1963 | Davidson et al. | 29/195 |
| 3,122,424 | 2/1964 | King | 29/195 |
| 3,196,536 | 7/1965 | Knippenberg et al. | 29/472.7 |
| 3,813,759 | 6/1974 | Heap et al. | 29/472.7 |
| 3,946,932 | 3/1976 | Peterson | 228/121 |
| 3,991,248 | 11/1976 | Bauer | 428/245 |
| 4,032,607 | 6/1977 | Schulz | 264/29.3 |
| 4,514,240 | 4/1985 | Heraud | 159/89 |
| 4,748,079 | 5/1988 | Thebault | 428/288 |
| 4,892,790 | 1/1990 | Gray | 428/548 |
| 5,021,107 | 6/1991 | Holko | 159/89 |
| 5,382,769 | 1/1995 | Jensen | 219/85.15 |
| 5,457,151 | 10/1995 | Graef et al. | 524/496 |
| 5,474,849 | 12/1995 | Graef et al. | 428/408 |
| 5,837,081 | 11/1998 | Ting et al. | 156/89.26 |

FOREIGN PATENT DOCUMENTS

| 504078 | 5/1939 | United Kingdom | 156/182 |
|---|---|---|---|

*Primary Examiner*—Nam Nguyen
*Assistant Examiner*—Steven H. VerSteeg
*Attorney, Agent, or Firm*—Robert Desmond, Esq.

[57] ABSTRACT

Carbon—carbon composite parts are joined with minimum surface preparation. A reactive-bonding joint interlayer having thickness greater than 1 mil is formed of fine particles of carbide-forming metallic ingredients and carbon. The joint interlayer is sandwiched between the two carbon—carbon parts to be joined and the assembly is heated under a compressive pressure to a temperature sufficient to complete the bonding reaction. No special surface preparation is required for the carbon—carbon parts due to the nature of the reactive-bonding. The mechanical properties of the joint are assured by selecting the metal-carbon ingredients so that thermal expansion mismatch is minimized. Shear strength exhibited by the resulting joints is greater than the interlaminar shear strength of the carbon—carbon composite material.

12 Claims, 1 Drawing Sheet

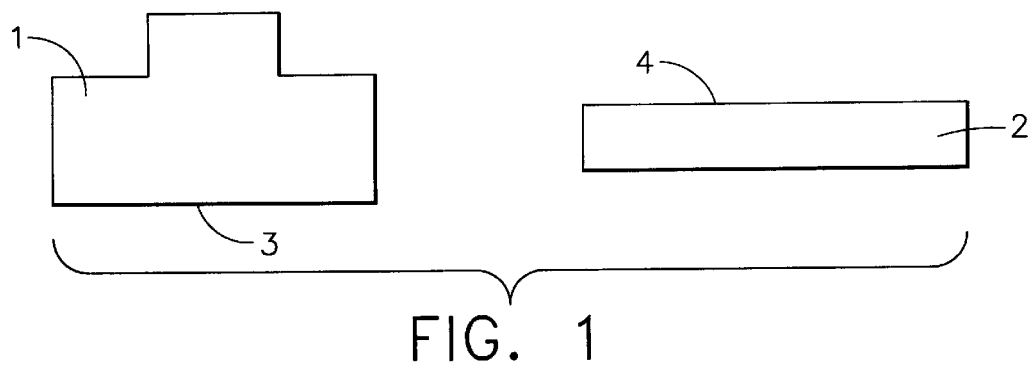
FIG. 1
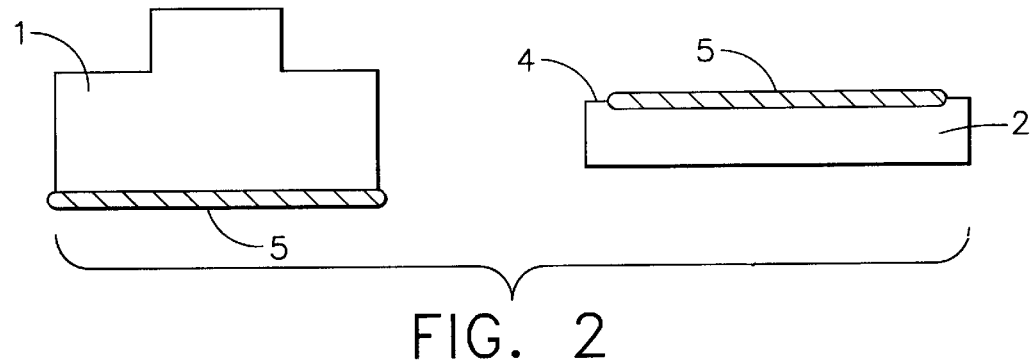
FIG. 2
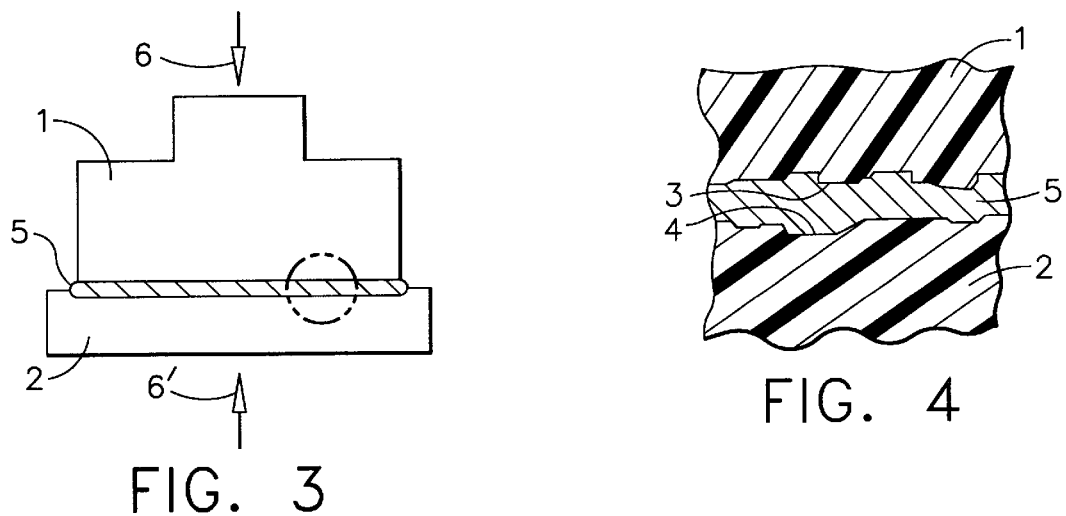
FIG. 3
FIG. 4
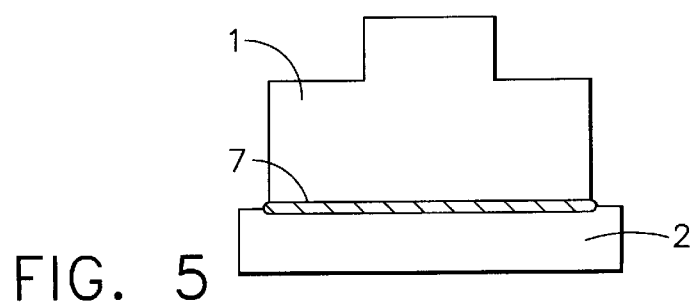
FIG. 5

JOINING OF ROUGH CARBON-CARBON COMPOSITES WITH HIGH JOINT STRENGTH

CROSS REFERENCE TO RELATED APPLICATIONS

This application claims the benefit of U.S. Provisional Application Ser. No. 60/006,996, Filed Nov. 20, 1995.

BACKGROUND OF THE INVENTION

1. Field of the Invention

The present invention relates to carbon—carbon composites, and more particularly to a method for joining carbon—carbon composites parts with minimum surface preparation.

2. Description of the Prior Art

Joining of carbon—carbon composites becomes increasingly important as new technology developments demand larger and more complex geometries. Available joining methods are limited to bonding with adhesive materials, alloy brazing, diffusion bonding, and welding. Joints produced by bonding with adhesive materials or alloy brazing are only suitable for low to intermediate temperature applications, well below the temperature capability of the carbon—carbon composites. Diffusion bonding using refractory metals or compounds usually requires quite careful joining surface preparations of essentially porosity free carbons as well as long heating times at very high temperatures (often >2000° C.) under high pressures. Welding requires even higher joining temperatures, and the joints produced are poor and exhibit low strength. U.S. Pat. No. 5,021,107 describes a process for joining finely finished carbon—carbon composites requiring a joint interlayer thickness of 25–100 micrometers. That process requires rather careful surface preparation and high joining temperatures close to the melting point (TMP, Tungsten is approximately 344° C.) of the joint interlayer material. Furthermore, the strength of the joints, which is low, was not specified in the patent. There is a strong technical need for a process for joining common carbon—carbon composites which requires minimal surface preparation and produces joints having high strength and high temperature application capability. Further needed is a process that produces reliable joints at low temperatures under low pressures.

SUMMARY OF THE INVENTION

The present invention provides for the joining of carbon—carbon composites by a reactive-bonding process that requires minimal surface preparation. Generally stated, the process is used for joining two carbon—carbon composite parts, and comprising the steps of: (a) preparing a reactive-bonding layer having a thickness ranging from about 25 to 2500 micrometers and a dimension matching the smaller faying surface of the carbon—carbon parts to be joined, the layer being comprised of fine particle sized, carbide-forming metallic ingredients and carbon, and having a composition that is nonstoichiometric, metal-rich; (b) assembling the carbon—carbon parts and the reactive-bonding layer to form a setup in which the reactive-bonding layer becomes the joint interlayer between the parts; and (c) heating the setup under a compressive pressure in either a vacuum or an inert gas atmosphere for a time and at a temperature sufficient to complete a bonding reaction which is produced within said joint interlayer and between said interlayer and said carbon—carbon composite parts.

More specifically, in the process of the invention, the joint interlayer is made from a nonstoichiometric mixture of metallic ingredients and carbon, with a joint thickness greater than 25 micrometers. Such a mixture may include a binder system which may be an organic binder such as polyvinyl butyral. Since the carbon surface is not highly finished, the joint layer is expected to be 25 to 2500 micrometers. The presence of this thick interlayer requires that the thermal expansion of the joint be matched well with that of carbon—carbon and homogeneity of the interlayer composition. In the reaction bonding process of this invention, this effect is accomplished by careful selection of the metallic ingredient together with carbon and selection of the particle sizes so that diffusion and complete reaction can occur within a preselected time and temperature range. In this manner there is provided a high quality joint at temperatures as low as 1500° C. and diffusion time as small as ½ hour or less. The homogeneous interlayer thus formed exhibits high joint strength due to the superior thermal expansion match with carbon—carbon. As a result, the joining operation requires a lower capital investment and has a lower operating cost. Energy savings is another benefit afforded by the process of this invention. Advantageously, the surfaces of the two parts to be joined need not be specially prepared, as long as the surface roughness is below as much as 2500 micrometers. The elimination of the surface preparation step simplifies the joining process and results in cost savings as well as the reduction of production cycle times. The joint layer is sandwiched between the two surfaces and the assembly is held together under some pressure while being heated to a temperature and for a time sufficient to facilitate the completion of the bonding reaction. Such a joining operation can usually be accomplished within 30 min. at a temperature considerably lower than half the melting point of the metallic ingredients in the joint interlayer. High joint strength is assured by selecting metal-carbon ingredients so that the thermal expansion mismatch is minimized. The joint shear strength of the products produced by the process of the invention is much higher than the interlaminar shear strength of the carbon—carbon composites. Advantageously, the products of the present invention are suitable for use at elevated temperature as high as 2800° C.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 1 is a sectional view showing, schematically, two carbon—carbon composite parts appointed to be joined;

FIG. 2 is a sectional view showing, schematically, the parts with the reactive-bonding layers applied to the joining surfaces;

FIG. 3 is a sectional view of the interlayer joining area showing, schematically, the setup during the joining operation;

FIG. 4 is an enlargement of the section of the interlayer joining area shown in FIG. 3; and FIG. 5 is a sectional view showing, schematically, the bonded carbon—carbon composite piece.

DETAILED DESCRIPTION OF THE PREFERRED EMBODIMENTS

The present invention provides a method for joining carbon—carbon composite parts at relatively low temperatures and with minimum surface preparation of the parts. The process by which the invention is carried out is described hereinafter with reference to FIGS. 1 through 5 of the drawings.

Referring to FIG. 1, there is shown carbon—carbon composite parts 1 and 2 appointed to be joined. No special preparation is needed for the two parts to be bonded to faying surfaces 3 and 4. A reactive-bonding layer 5 is applied either onto one of the surfaces 3 and 4, or onto both of them, as shown in FIG. 2. The two parts are put together so that the reactive-bonding layer becomes the interlayer 5 between parts 1 and 2. The reactive-bonding layer 5 can be applied to the surfaces 3 and 4 by a variety of coating methods such as brush-painting or spraying, using slurries of the powders and liquid carriers, e.g., isopropanol with or without a binder. Such a binder may be an organic binder, an example of which may be polyvinyl butyral. Alternatively, this joint layer can be applied in the form of a piece of tape of desired thickness made of plastic binder and the powders. The small quantity of binder will evaporate or burn-out during the heating in the joining operation. The benefit of using a binder is that it provides sufficient "green" joint strength so that the parts can be safely handled and transferred before the heating operation without the risk of being broken apart. In addition, it is easier to control the joint interlayer thickness by using a tape with a predetermined thickness. The reactive-bonding compound interlayer should have a thickness greater than 25 micrometers to achieve good joining results.

After application of the reactive-bonding layer, the parts are heated to a temperature sufficient to complete the bonding reaction, which occurs mostly within the joint interlayer but also, to a small degree, between the interlayer and the carbon—carbon composite parts. A compressive pressure, ranging from 0.1 to 50 megapascals, 6 and 6' is applied on the parts during the heating process. The joining operation is done either in a vacuum or in an inert gas atmosphere. The parts are firmly bonded together upon cooling and become one solid piece. After the joining operation, the joint interlayer 7 consists of mainly refractory carbides and, in some cases, a smaller amount of suicides, and are suitable for high temperature applications.

The reactive-bonding layers are metal-rich, nonstoichiometric mixtures of metals and carbon. The metals included in the compounds may include at least one element selected from the group consisting of W, Ti, Si, Ta, Nb, Zr, Hf, V, Cr, and Mo. The metals selected react with carbon during the joining operation to form refractory carbides and smaller amounts of silicides if silicon is also one of the ingredients. This ensures a good high temperature stability for the joints produced. Tungsten is the preferred major metallic ingredient in the joint compound because the reaction product, tungsten carbide, has the lowest coefficient of thermal expansion among metallic carbides. For this reason, tungsten matches well with the low coefficient of thermal expansion coefficient of a carbon—carbon. Smaller thermal expansion mismatch produces less thermal stresses in the joint and hence improves the joint strength. The joint shear strength obtained using the reactive-bonding method approaches 20 megapascals, which is much higher than the interlaminar shear strength (typically 7.9 megapascals) of the carbon—carbon composite material.

Fine powders (smaller than 100 micrometers in particle size) both for metallic ingredients and carbon are used in the joint layers. This is also essential to achieve a relatively low temperature joining operation because fine particle size due to its large surface area enhances the reaction rate and considerably reduces the joining temperature required to complete the carbides or suicides forming reaction.

In some cases, short carbon fibers having an average length up to 5 mm in length are incorporated into the reactive-bonding layer to further reinforce the joint and to achieve an even lower in-plane coefficient of thermal expansion for the joint. The advantages produced by the reinforcement effect of the fibers to ceramics will be readily apparent to those skilled in the art. The lower coefficient of thermal expansion of the joint comes from the fact that carbon fibers usually have a much lower coefficient of thermal expansion in the longitudinal (along the fiber length) direction as compared to the transversal (across the fiber section) direction and the application of pressure during the joining process naturally aligns the fibers in the plane of the joint layer. The 'in-plane coefficient of thermal expansion' of the joint is the most critical parameter, since it controls the joint integrity.

The reactive-bonding layer may also contain one or more refractory compounds as filler materials from the family of borides, carbides, silicides, and nitrides. Representative of such refractory compounds are $TiB_2$, $BN$, $B_4C$, $SiC$, $TiC$, $MoSi_2$, $WSi_2$.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

The carbon—carbon composite material used in the joining experiments was manufactured by Carbon—Carbon Advanced Technologies, Inc., Fort Worth, Tex. This laminated material was fabricated using an ACC-4 impregnation/pyrolysis process. The sheet material had a thickness of 4.6 mm and joining specimens of size 10 mm by 20 mm were cut. No special surface preparation was employed on the as-received material.

Example 1

A reactive-bonding slurry was made from 10 grams tungsten powder (particle size≦3 micrometers) and 0.5 grams carbon powder (particle size ≦44 micrometers) and about 12 milliliters of methanol. The slurry was applied by brush painting onto the faying surfaces of the two 20 mm×10 mm×4.6 mm carbon—carbon composite parts to be joined. The faying surfaces were parallel to the plane of the carbon reinforcing plies. After partial drying of the slurry paint layers, the two parts were put together so that the reactive-bonding layer was ~150 micrometers. The specimen was then heated in an argon atmosphere and under a compressive pressure of 5 megapascals to a temperature in the range of 1450° C. to 1580° C. for a time of 10 to 30 minutes.

After cooling, the joint composition was analyzed by X-ray diffraction method and was found to contain mixtures of tungsten carbides, WC and $W_2C$, as expected. The joint shear strength of the specimen was determined by double-notch shear testing technique. The strength value obtained was 20.8 megapascals at room temperature and 19.2 megapascals at 1620° C.

Example 2

A reactive-bonding compound slurry was made from 5 grams tungsten powder (particle size≦3 micrometers), 0.5 grams titanium powder (particle size≦37 micrometers), 0.5 grams silicon powder (particle size≦10 micrometers), and 0.5 grams carbon powder (particle size≦44 micrometers) and about 12 milliliters of methanol. The preparation of the joining specimens and the joining operation were carried out in the same way as described in Example 1. After joining, the joint composition was analyzed by X-ray diffraction method and was found to be mixtures of tungsten carbide WC, $W_2C$, titanium carbide (TiC), and mixtures of tungsten silicides, $W_5Si_3$, $WSi_2$. The room temperature joint shear strength determined by double-notch shear testing technique was 12.4 megapascals.

Example 3

A reactive-bonding tape was prepared from the following ingredients: 10 grams tungsten powder (particle size≦3 micrometers), 0.5 grams carbon powder (particle size≦44 micrometers), 0.61 grams polyvinyl butyral (binder), and 0.61 grams butyl benzyl phthalate (plasticizer). The mixture was rolled using a standard calendering process into a 130 micrometers thick tape. A 20 mm×10 mm piece was cut from the tape and then placed as the interlayer between the two faying surfaces of the carbon—carbon parts to be joined. The two faying surfaces were initially brush painted with isopropanol to facilitate adhesion between the tape and the surfaces. The subsequent joining operation was carried out in the same manner as described in Example 1. The heating rate before 400° C. in vacuum was reduced to encourage the evaporation of the solvent and the decomposition of the binder and plasticizer. The sample was held at this temperature for an additional 30 minute to completely remove the additives. For specimens produced in this manner, the room temperature joint shear strength determined by double-notch shear testing technique was 21.1 megapascals.

Example 4

A reactive-bonding slurry was prepared from 19.37 grams tungsten powder (particle size≦3 micrometers), 1.12 grams carbon powder (particle size≦44 micrometers), 0.26 grams polyvinyl butyral (binder), 0.26 grams butyl benzyl phthalate (plasticizer), 30 grams isopropanol, and 0.75 grams chopped short carbon fibers (1 to 5 mm in length). The preparation of the joining specimens and the joining operation were carried out in the same manner as described in Example 1, except that a slow heating rate before 400° C. in vacuum and an additional hold of 30 minutes at this temperature was employed to decompose and evaporate the binder and plasticizer.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A reactive-bonding method for joining two carbon—carbon composite parts, each carbon—carbon part having at least one faying area, comprising the steps of:
   a. preparing a reactive-bonding layer having a thickness ranging from about 25 to 2500 micrometers and a dimension matching the faying area of the carbon—carbon parts to be joined, said reactive-bonding layer being comprised of a mixture of fine particle-sized, carbide forming metallic ingredients, and carbon, and having a composition that is metal rich;
   b. assembling said carbon—carbon parts and said reactive-bonding layer to form a setup in which the reactive-bonding layer forms a joint interlayer between the parts;
   c. heating said setup under a compressive pressure in either a vacuum or an inert gas atmosphere for a time and at a temperature sufficient to complete a bonding reaction to form a compound selected from the group consisting of borides, carbides, silicides and nitrides and which compound is produced within said joint interlayer and between said joint interlayer and said carbon—carbon composite parts, forming a bond between said joint interlayer and between said carbon—carbon composite parts that is non-porous, wherein said metallic ingredients of said reactive-bonding layer have melting points, and said temperature of said heating of said setup can be reduced to a temperature that is less than one-half the melting point of the metallic ingredients.

2. A method as recited by claim 1, wherein the metallic ingredients of the reactive-bonding layer comprise at least one element selected from the group consisting of: W, Ti, Si, Ta, Nb, Zr, Hf, V, Cr, and Mo.

3. A method as recited by claim 1, wherein the reactive-bonding layer additionally comprises a filler material composed of at least one refractory compound selected from the group consisting of: borides, carbides, silicides, and nitrides.

4. A method as recited by claim 1, wherein said compressive pressure applied to said setup ranges from about 0.1 to 50 megapascals.

5. A method as recited by claim 1, whereby, after being joined, said carbon—carbon composite parts form a carbon—carbon joint having a joint shear strength greater than the interlaminar shear strength of the carbon—carbon parts.

6. The method of claim 1, whereby, after being joined, said carbon—carbon composite parts form a carbon—carbon joint having a thickness greater than 25 micrometers and said joint interlayer has a thermal expansion matched to the carbon—carbon parts.

7. A reactive-bonding method for joining two carbon—carbon composite parts, each carbon—carbon part having at least one faying area, consisting of the steps of:
   a. preparing a reactive-bonding layer having a thickness ranging from about 25 to 2500 micrometers and a dimension matching the faying area of the carbon—carbon parts to be joined, said reactive-bonding layer being comprised of a mixture of fine particle-sized, carbide forming metallic ingredients, and carbon, and having a composition that is metal rich;
   b. assembling said carbon—carbon parts and said reactive-bonding layer to form a setup in which the reactive-bonding layer forms a joint interlayer between the parts;
   c. heating said setup under a compressive pressure in either a vacuum or an inert gas atmosphere for a time and at a temperature sufficient to complete a bonding reaction to form a compound selected from the group consisting of borides, carbides, silicides and nitrides and which compound is produced within said joint interlayer and between said joint interlayer and said carbon—carbon composite parts, forming a bond between said joint interlayer and between said carbon—carbon composite parts that is non-porous, wherein said metallic ingredients of said reactive-bonding layer have melting points, and said temperature of said heating of said setup can be reduced to a temperature that is less than one-half the melting point of the metallic ingredients.

8. A method as recited by claim 7, wherein the metallic ingredients of the reactive-bonding layer comprise at least one element selected from the group consisting of: W, Ti, Si, Ta, Nb, Zr, Hf, V, Cr, and Mo.

9. A method as recited by claim 7, wherein the reactive-bonding layer additionally comprises a filler material composed of at least one refractory compound selected from the group consisting of: borides, carbides, silicides, and nitrides.

10. A method as recited by claim 7, wherein said compressive pressure applied to said setup ranges from about 0.1 to 50 megapascals.

11. A method as recited by claim 7, whereby, after being joined, said carbon—carbon composite parts form a carbon—carbon joint having a joint shear strength greater than the interlaminar shear strength of the carbon—carbon parts.

12. The method of claim 7, whereby, after being joined, said carbon—carbon composite parts form a carbon—carbon joint having a thickness greater than 25 micrometers and said joint interlayer has a thermal expansion matched to the carbon—carbon parts.

* * * * *